United States Patent
Wen (10) Patent No.: US 11,620,995 B2
(45) Date of Patent: Apr. 4, 2023

(54) VOICE INTERACTION PROCESSING METHOD AND APPARATUS

(71) Applicant: HUAWEI TECHNOLOGIES CO., LTD., Guangdong (CN)

(72) Inventor: Bailin Wen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 16/840,753

(22) Filed: Apr. 6, 2020

(65) Prior Publication Data

US 2020/0234707 A1 Jul. 23, 2020

Related U.S. Application Data

(63) Continuation of application No. PCT/CN2019/084692, filed on Apr. 26, 2019.

(30) Foreign Application Priority Data

Oct. 29, 2018 (CN) .......................... 201811271551.6

(51) Int. Cl.
*G10L 15/25* (2013.01)
*G10L 17/00* (2013.01)
(Continued)

(52) U.S. Cl.
CPC ................ *G10L 15/22* (2013.01); *G06T 7/70* (2017.01); *G10L 2015/223* (2013.01)

(58) Field of Classification Search
USPC ....................................................... 704/275
See application file for complete search history.

(56) References Cited

U.S. PATENT DOCUMENTS

| 9,973,732 B1* | 5/2018 | Goetz .................. H04N 5/2628 |
| 2012/0062729 A1* | 3/2012 | Hart ........................ H04N 7/142 |
| | | 348/135 |

(Continued)

FOREIGN PATENT DOCUMENTS

| CN | 103745723 A | 4/2014 |
| CN | 104834222 A | 8/2015 |

(Continued)

OTHER PUBLICATIONS

PCT International Search Report and Written Opinion issued in International Application No. PCT/CN2019/084692 dated Jul. 11, 2019, 13 pages (partial English translation).

(Continued)

*Primary Examiner* — Marcellus J Augustin
(74) *Attorney, Agent, or Firm* — Fish & Richardson P.C.

(57) ABSTRACT

This application provides a voice interaction processing method and apparatus, to achieve a friendly and natural voice interaction effect and reduce power consumption. In the method, a microprocessor enables an image collector only when determining, based on voice data collected by a voice collector, that a first user is a target user; then the image collector collects user image data and transmits the user image data to the microprocessor; and the microprocessor sends a wakeup instruction to an application processor only when determining, based on the user image data, that the target user is in a voice interaction state. Based on the foregoing method, nus-enabling of the image collector and the application processor is avoided to some extent, and power consumption is reduced.

15 Claims, 4 Drawing Sheets

(51) Int. Cl.
    *G10L 17/22* (2013.01)
    *G10L 15/22* (2006.01)
    *G06T 7/70* (2017.01)

(56) References Cited

U.S. PATENT DOCUMENTS

| | | | |
|---|---|---|---|
| 2016/0116960 A1* | 4/2016 | Kwak | G06F 1/3206 |
| | | | 713/323 |
| 2016/0379107 A1 | 12/2016 | Li et al. | |
| 2018/0150280 A1* | 5/2018 | Rhee | G06F 3/0488 |
| 2018/0247065 A1* | 8/2018 | Rhee | G10L 15/22 |
| 2019/0228212 A1 | 7/2019 | Gao | |
| 2019/0228217 A1 | 7/2019 | Gao | |

FOREIGN PATENT DOCUMENTS

| | | | | |
|---|---|---|---|---|
| CN | 104951077 | A | 9/2015 | |
| CN | 205038456 | U | 2/2016 | |
| CN | 105426723 | A | 3/2016 | |
| CN | 105786438 | A | 7/2016 | |
| CN | 106572299 | A | 4/2017 | |
| CN | 106653014 | A | 5/2017 | |
| CN | 106782524 | * | 5/2017 | ............ G10L 15/26 |
| CN | 107678793 | A | 2/2018 | |
| CN | 107918726 | A | 4/2018 | |
| CN | 108154140 | A | 6/2018 | |
| CN | 108181992 | A | 6/2018 | |
| CN | 108182939 | A | 6/2018 | |
| CN | 207704862 | U | 8/2018 | |
| CN | 108600695 | A | 9/2018 | |

OTHER PUBLICATIONS

Office Action issued in Chinese Application No. 201811271551.6 dated Mar. 9, 2022, 17 pages (with English translation).

* cited by examiner

VOICE INTERACTION PROCESSING METHOD AND APPARATUS

CROSS-REFERENCE TO RELATED APPLICATIONS

This application is a continuation of International Application No. PCT/CN2019/084692, filed on Apr. 26, 2019, which claims priority to Chinese Patent 201811271551.6, filed on Oct. 29, 2018. The disclosures of the aforementioned applications are hereby incorporated by reference in their entireties.

TECHNICAL FIELD

Embodiments of this application relate to the field of computer technologies, and in particular, to a voice interaction processing method and apparatus.

BACKGROUND

As a new generation of user interaction mode after keyboard interaction, mouse interaction, and touchscreen interaction, due to features of convenience and fastness, voice interaction is gradually favored by users, and is widely used in various electronic devices. For example, a voice assistant is installed on a smart mobile terminal, and a user may perform voice interaction with the smart mobile terminal by using the voice assistant.

Currently, when using voice interaction software such as the voice assistant, the user usually needs to first wake up the voice interaction software by using a specific wakeup keyword before entering a corresponding voice operation instruction into the voice interaction software to implement voice interaction. For example, when using a voice assistant Sill., the user needs to first wake up Sill by using a specific wakeup keyword "Hey Siri"; or when using a voice assistant on Huawei Mate 10, the user needs to first wake up the voice assistant by using a specific wakeup keyword "Hello, Xiao E". In the foregoing using process, each time the user uses the voice interaction software, the user needs to say a wakeup keyword first, and consequently, a voice interaction process is unfriendly and an effect of natural interaction cannot be achieved. If the voice interaction software is in a running state for a long time, power consumption of a device is increased, thereby deteriorating user experience.

SUMMARY

This application provides a voice interaction processing method and apparatus, to achieve a friendly and natural voice interaction effect and reduce power consumption.

A solution provided in this application is described below from a plurality of aspects. It should be understood that, for implementations and beneficial effects of the aspects, refer to each other.

According to a first aspect, a voice interaction processing apparatus is provided, where the apparatus includes a voice collector, an image collector, a microprocessor, and an application processor. The voice collector is configured to collect voice data of a first user and transmit the voice data to the microprocessor; the microprocessor is configured to enable the image collector when determining, based on the voice data of the first user, that the first user is a target user; the image collector is configured to collect user image data and transmit the user image data to the microprocessor; the microprocessor is further configured to send, to the application processor when determining, based on the user image data, that the target user is in a voice interaction state, a wakeup instruction used to wake up voice interaction software; and the application processor is configured to receive the wakeup instruction and wake up the voice interaction software to provide a voice interaction function for the target user.

The apparatus may be a terminal device, such as an artificial intelligent robot, a mobile phone, a smart speaker, or an automatic teller machine.

In the foregoing technical solution, a user does not need to wake up the voice interaction software by using a wakeup keyword, but instead, the microprocessor with relatively low power consumption receives and processes the voice data transmitted by the voice collector and the user image data transmitted by the image collector, and when determining that the target user is in the voice interaction state, the microprocessor sends, to the application processor, the wakeup instruction used to wake up the voice interaction software, to provide the voice interaction function for the target user. Therefore, a friendly and natural voice interaction effect is achieved, and the voice interaction software does not need to be in an operating state for a long time, thereby reducing power consumption of the apparatus.

In a possible implementation of the first aspect, the microprocessor is specifically configured to: obtain a user image feature based on the user image data, and determine, based on the user image feature, that the target user is in the voice interaction state. The user image data herein may be understood as raw data of one or more images or raw data of a video, and the user image feature is feature data extracted from the raw data.

In a possible implementation of the first aspect, the microprocessor is specifically configured to: obtain a user voiceprint feature based on the voice data of the first user, and determine, based on the user voiceprint feature, that the first user is the target user. In other words, the microprocessor determines, through voiceprint recognition, that the first user is the target user.

In a possible implementation of the first aspect, when determining, based on the user image feature, that the target user is in the voice interaction state, the microprocessor is specifically configured to: determine, by using a face recognition method, that the user image feature matches a target image feature of the target user, and determine, by using a live detection method, that the target user is in the voice interaction state. In the foregoing possible implementation, a simple and effective method for determining that the target user is in the voice interaction state is provided.

In a possible implementation of the first aspect, the apparatus further includes: a posture sensor, configured to detect a posture parameter of the apparatus and transmit the posture parameter to the microprocessor; the image collector includes a front-facing image collector and a rear-facing image collector; and the microprocessor is further configured to: when determining, based on the posture parameter, that the apparatus is in a front placement posture, send a first enabling instruction to the front-facing image collector to enable the front-facing image collector; or the microprocessor is further configured to: when determining, based on the posture parameter, that the apparatus is in a back placement posture, send a second enabling instruction to the rear-facing image collector to enable the rear-facing image collector. In the foregoing possible implementation, the image collector can be accurately enabled, thereby further reducing power consumption of the apparatus.

In a possible implementation of the first aspect, the apparatus further includes: a distance sensor, configured to detect a distance between the first user and the apparatus and transmit the distance to the microprocessor; and the microprocessor is further configured to: when determining that the distance is less than or equal to a preset distance, send a third enabling instruction to the voice collector to enable the voice collector. In the foregoing possible implementation, it is determined, only when the user approaches the apparatus, that the user is to interact with the apparatus, and the voice collector is enabled in this case. Therefore, power consumption of the apparatus can be further reduced.

According to a second aspect, a voice interaction processing method is provided, where the method is applied to an apparatus including a voice collector, an image collector, a microprocessor, and an application processor, and the method includes: collecting, by the voice collector, voice data of a first user, and transmitting the voice data to the microprocessor; enabling, by the microprocessor, the image collector when determining, based on the voice data of the first user, that the first user is a target user; collecting, by the image collector, user image data, and transmitting the user image data to the microprocessor; sending, by the microprocessor, a wakeup instruction to the application processor when determining, based on the user image data, that the target user is in a voice interaction state; and receiving, by the application processor, the wakeup instruction, and waking up, by the application processor, voice interaction software to provide a voice interaction function for the target user.

In a possible implementation of the second aspect, the determining, by the microprocessor based on the user image data, that the target user is in a voice interaction state includes: obtaining a user image feature based on the user image data, and determining, based on the user image feature, that the target user is in the voice interaction state. The user image data herein may be understood as raw data of one or more images or raw data of a video, and the user image feature is feature data extracted from the raw data.

In a possible implementation of the second aspect, the determining, by the microprocessor based on the voice data of the first user, that the first user is a target user includes: obtaining a user voiceprint feature based on the voice data of the first user, and determining, based on the user voiceprint feature, that the first user is the target user. In other words, the microprocessor determines, through voiceprint recognition, that the first user is the target user.

In a possible implementation of the second aspect, the determining, by the microprocessor based on the user image data, that the target user is in a voice interaction state specifically includes: determining, based on the user image data and by using a live detection method, that the target user is in the voice interaction state.

In a possible implementation of the second aspect, the apparatus further includes a posture sensor, the image collector includes a front-facing image collector and a rear-facing image collector, and the method further includes: detecting, by the posture sensor, a posture parameter of the apparatus, and transmitting the posture parameter to the microprocessor; and when determining, based on the posture parameter, that the apparatus is in a front placement posture, sending, by the microprocessor, a first enabling instruction to the front-facing image collector to enable the front-facing image collector; or when determining, based on the posture parameter, that the apparatus is in a back placement posture, sending, by the microprocessor, a second enabling instruction to the rear-facing image collector to enable the rear-facing image collector.

In a possible implementation of the second aspect, the apparatus further includes a distance sensor, and the method further includes: detecting, by the distance sensor, a distance between the first user and the apparatus, and transmitting the distance to the microprocessor; and when determining that the distance is less than or equal to a preset distance, sending, by the microprocessor, a third enabling instruction to the voice collector to enable the voice collector.

It may be understood that for beneficial effects that can be achieved by the voice interaction processing method provided above, refer to the beneficial effects of the corresponding apparatus provided above. Details are not described herein again.

DESCRIPTION OF EMBODIMENTS

In this application, "at least one" means one or more, and "a plurality of" means two or more. The term "and/or" describes an association between associated objects and represents that three associations may exist. For example, A and/or B may indicate that only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, a-b, a-c, b-c, or a-b-c, where a, b, and c may be singular or plural. In addition, in the embodiments of this application, words such as "first" and "second" do not limit a quantity and an execution sequence.

It should be noted that, in this application, the word "example" or "for example" is used to give an example, an illustration, or a description. Any embodiment or design solution described as an "example" or "for example" in this application should not be explained as being more preferred or having more advantages than another embodiment or design solution. Exactly, use of the word "example", "for example", or the like is intended to present a related concept specifically.

A voice interaction processing method provided in this application may be applied to a human-computer interaction scenario, and a user can friendly and naturally interact with a voice interaction device on which voice interaction software is installed, without need to wake up the voice interaction software by using a specific wakeup keyword, thereby improving user experience. The voice interaction device herein may be a device configured to perform voice interaction with the user, and the device may be a mobile phone, a tablet computer, a camera, a computer, a wearable device, a vehicle-mounted device, or a portable device. For ease of description, the foregoing device and the foregoing device with a built-in chip system are collectively referred to as an electronic device in this application.

Figure 1:
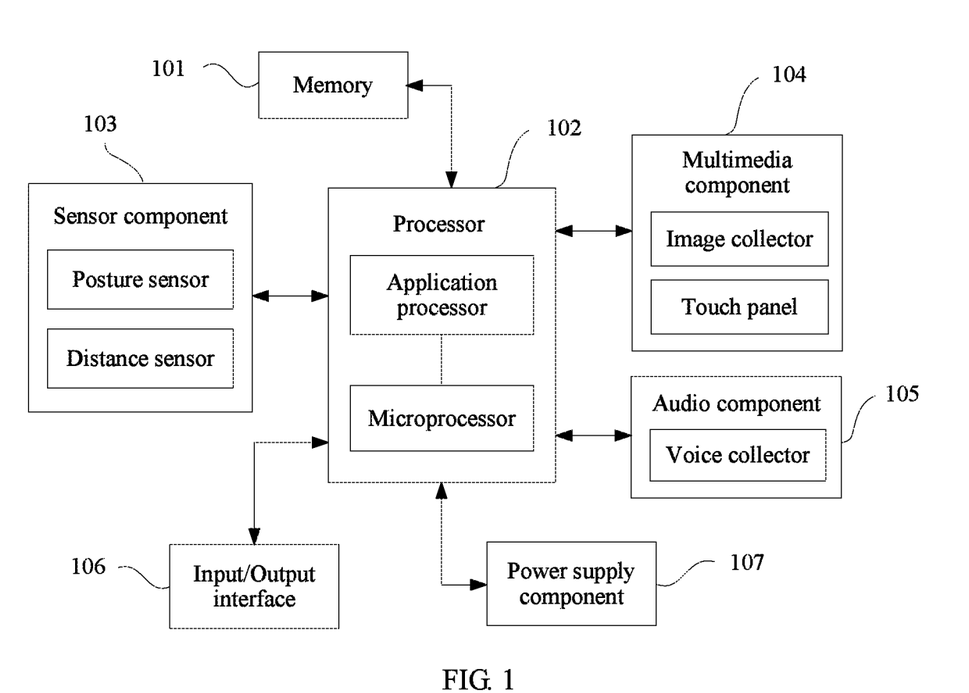
FIG. 1 is a schematic structural diagram of an electronic device according to an embodiment of this application.

FIG. 1 is a schematic structural diagram of an electronic device according to an embodiment of this application. In FIG. 1, a mobile phone is used as an example of the electronic device for description. The mobile phone or a chip system built in the mobile phone includes a memory 101, a processor 102, a sensor component 103, a multimedia component 104, an audio component 105, an input/output interface 106, and a power supply component 107.

With reference to FIG. 1, the following specifically describes each component of the mobile phone or the chip system built in the mobile phone.

The memory 101 may be configured to store data, a software program, and a module, and mainly includes a program storage area and a data storage area. The program storage area may store a software program that includes an instruction formed by code, including but not limited to an operating system and an application program that is required by at least one function, such as an audio playing function and an image playing function. The data storage area may store data created based on use of the mobile phone, such as audio data, image data, and a phone book. In some feasible embodiments, there may be one memory, or there may be a plurality of memories. The memory may be a floppy disk, a hard disk such as a built-in hard disk or a removable hard disk, a magnetic disk, a compact disc, a magneto-optical disk such as a CD_ROM or a DCD_ROM, or a non-volatile storage device such as a RAM, a ROM, a PROM, an EPROM, an EEPROM, a flash memory, or any other form of storage medium known in the art.

As a control center of the mobile phone, the processor 102 connects the parts of the entire device by using various interfaces and lines, and performs various functions of the mobile phone and processes data by running or executing a software program and/or a software module stored in the memory 101 and by invoking data stored in the memory 101, to perform overall monitoring on the mobile phone. In this embodiment of this application, the processor 102 may integrate an application processor (Application Processor, AP) and a microprocessor. The AP mainly processes an operating system, a user interface, an application program, and the like. The microprocessor may be configured to receive and process data collected by a plurality of components such as the sensor component 103 and the multimedia component 104, and control enabling and disabling of the plurality of components. It may be understood that the microprocessor may alternatively not be integrated into the processor 102.

In addition, the processor 102 may further include another hardware circuit or an accelerator, such as an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor 102 may be a combination implementing a computing function, for example, a combination of one or more microprocessors, or a combination of a digital signal processor and a microprocessor.

The sensor component 103 includes one or more sensors, and is configured to provide status evaluation in various aspects for the mobile phone. The sensor component 103 may include a distance sensor and a posture sensor. The distance sensor is configured to detect a distance between an external object and the mobile phone, and the posture sensor is configured to detect a placement posture of the mobile phone, such as a cceleration/deceleration or an orientation. For example, the distance sensor in this embodiment of this application may be an optical sensor, and the posture sensor may be an acceleration sensor or a gyroscope sensor. In addition, the sensor component 103 may further include a magnetic sensor, a pressure sensor, or a temperature sensor. The sensor component 103 may further detect an on/off state of the mobile phone, a relative position of the component, or a temperature change of the mobile phone. In this embodiment of this application, the sensor component 103 may send various detected status parameters to the microprocessor with relatively low power consumption for processing.

The multimedia component 104 provides a screen of an output interface between the mobile phone and a user. The screen may be a touch panel, and when the screen is a touch panel, the screen may be implemented as a touchscreen to receive an input signal from the user. The touch panel includes one or more touch sensors to sense touching, sliding, and a gesture on the touch panel. The touch sensor may not only sense a boundary of a touching or sliding action, but also detect duration and pressure related to the touching or sliding operation. In addition, the multimedia component 104 further includes an image collector, and the multimedia component 104 includes a front-facing image collector and/or a rear-facing image collector. For example, the front-facing image collector in this embodiment of this application may be a front-facing camera, and the rear-facing image collector may be a rear-facing camera. Regardless of the front-facing camera or the rear-facing camera, a quantity of cameras is not limited in this embodiment. A used image collection method may be capturing a single image or a plurality of images, or may be shooting a video.

When the mobile phone is in an operating mode, such as an image shooting mode or a video shooting mode, the front-facing camera. and/or the rear-facing camera may sense an external multimedia signal, and the signal is used to form an image frame. Each front-facing camera and each rear-facing camera may be a fixed optical lens system or may have a focal length and an optical zoom capability. In this embodiment of this application, the multimedia component 104 may send the collected image data to the microprocessor with relatively low power consumption for processing, and the microprocessor may control enabling and disabling of the front-facing image collector and/or the rear-facing image collector.

The audio component 105 may provide an audio interface between the user and the mobile phone. For example, the audio component 105 may include a voice collector. The voice collector in this embodiment of this application may be a microphone. The audio component 105 may further include an audio circuit and a speaker, or the voice collector may further include an audio circuit and a speaker. Specifically, the audio circuit may transmit an electrical signal converted from received audio data to the speaker, and the speaker converts the electrical signal into a sound signal and outputs the sound signal. In another aspect, the microphone converts a collected sound signal into an electrical signal, and then the audio circuit converts the electrical signal into audio data after receiving the electrical signal, and outputs the audio data to the input/output interface 106 to send to, for example, another mobile phone, or outputs the audio data to the processor 102 for further processing. In this embodiment of this application, the audio component 105 may send the collected audio data. to the microprocessor with relatively low power consumption for processing.

The input/output interface 106 provides an interface between the processor 102 and a peripheral interface module, For example, the peripheral interface module may include a keyboard, a mouse, or a USB (universal serial bus) device. In a possible implementation, the input/output interface 106 may have only one input/output interface, or may have a plurality of input/output interfaces. The power supply component 107 is configured to supply power to each component of the mobile phone. The power supply component 107 may include a power management system, one or more power supplies, and another component related to power generation, power management, and power distribution of the mobile phone.

Although not shown, the mobile phone may further include a wireless fidelity (Wireless Fidelity, WiFi) module, a Bluetooth module, and the like. Details are not described in this embodiment of this application. A person skilled in the art may understand that a structure of the mobile phone shown in FIG. 1 does not constitute any limitation on the mobile phone, and the mobile phone may include more or fewer components than those shown in the figure, or combine some components, or have different component arrangements.

Figure 2:
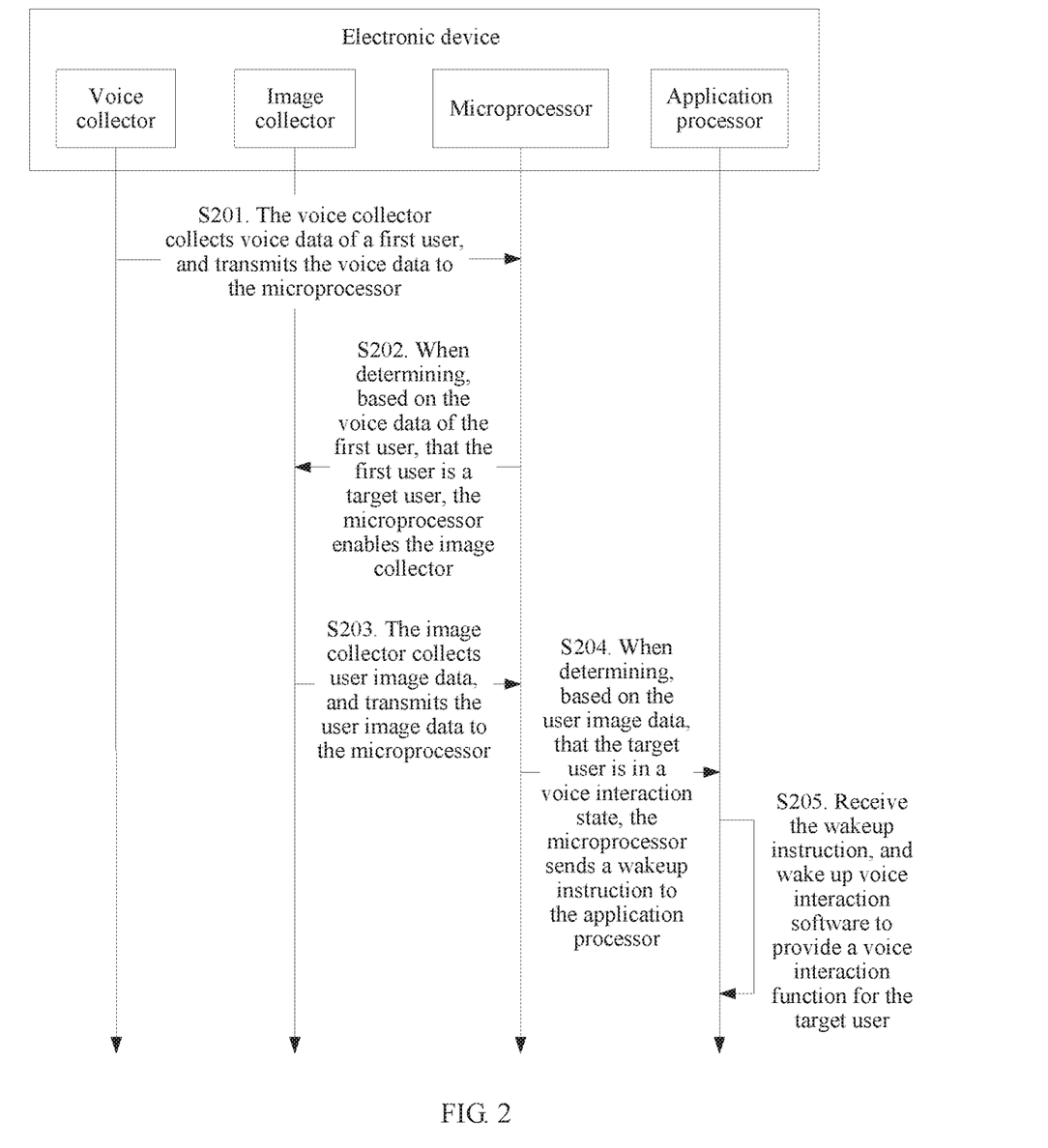
FIG. 2 is a schematic flowchart of a voice interaction processing method according to an embodiment of this application.

FIG. 2 is a schematic flowchart of a voice interaction processing method according to an embodiment of this application. The method may be applied to an apparatus including a voice collector, an image collector, a microprocessor, and an application processor. For example, the apparatus is the electronic device shown in FIG. 1. Referring to FIG. 2, the method includes the following steps.

S201, The voice collector collects voice data of a first user, and transmits the voice data to the microprocessor.

The voice collector may be a component configured to collect the voice data in the electronic device. For example, the voice collector may include a microphone, or may include a microphone and an audio circuit. The first user may be any user that can be collected by the voice collector. For example, the first user may be a user holding the electronic device, or a user who is relatively close to the electronic device. The voice data of the first user may be a sound signal of the first user that is collected by the voice collector, or audio data obtained by converting the sound signal.

Specifically, the voice collector may be a voice collector with low power consumption, and the voice collector may be in an enabled state. When the voice collector detects voice of the first user, the voice collector may collect the voice data of the first user, and transmit the collected voice data of the first user to the microprocessor.

S202. When determining, based on the voice data of the first user, that the first user is a target user, the microprocessor enables the image collector.

Specifically, the electronic device pre-stores a voiceprint feature of one or more users. The microprocessor obtains a user voiceprint feature based on the voice data of the first user, and determines, based on the user voiceprint feature, that the first user is the target user.

The microprocessor may be a processor with relatively low power consumption. For example, the microprocessor may be a sensor hub (sensor hub) or a microcontroller. The user voiceprint feature may be a voice feature used to uniquely identify a user. For example, the user voiceprint feature may include one or more of sound intensity, and a frequency value, a trend, and a waveform of a formant.

In addition, the image collector may be a component configured to collect a user image. For example, the image collector may be a camera of the electronic device. Optionally, the image collector may include a front-facing image collector (for example, a front-facing camera) and/or a rear-facing image collector (for example, a rear-facing camera). The target user herein may be a preset user. For example, the target user may be an owner of the electronic device, or another user who frequently uses the electronic device. This is not specifically limited in this embodiment of this application.

Specifically, if the voice data of the first user is a sound signal, when receiving the sound signal, the microprocessor may convert the sound signal into audio data, and extract the user voiceprint feature from the audio data obtained through conversion. Alternatively, if the voice data of the first user is already the audio data obtained through conversion, when receiving the audio data, the microprocessor may directly extract the user voiceprint feature from the audio data. In addition, the microprocessor may pre-obtain and store a voiceprint feature of the target user. When the microprocessor extracts the user voiceprint feature, the microprocessor may match the stored voiceprint feature of the target user with the user voiceprint feature. If the stored voiceprint feature of the target user matches the user voiceprint feature, the microprocessor determines that the first user is the target user. If the stored voiceprint feature of the target user does not match the user voiceprint feature, the microprocessor determines that the first user is not the target user. When the microprocessor determines that the first user is the target user, the microprocessor may send an enabling instruction to the image collector, to enable the image collector when the image collector receives the enabling instruction.

In some other embodiments, different users may have different permission levels, and some users may have higher permission levels, and can enter voice interaction without requiring subsequent image verification. In this case, whether a matched user meets a permission further needs to be determined, in other words, whether subsequent image verification is required. If subsequent image verification is required, the image collector is enabled.

It should be noted that for a method and a process in which the microprocessor extracts the user voiceprint feature from the audio data, refer to a related technology. This is not specifically limited in this embodiment of this application. In addition, that the stored voiceprint feature of the target user matches the user voiceprint feature may mean that the stored voiceprint feature of the target user and the user voiceprint feature are totally consistent, or a matching error falls within a specific fault tolerance range.

S203. The image collector collects user image data, and transmits the user image data to the microprocessor.

After the image collector is enabled, the image collector may capture a user image, collect the user image data in real time, periodically, or aperiodically, and transmit the collected user image data to the microprocessor.

S204. When determining, based on the user image data, that the target user is in a voice interaction state, the microprocessor sends, to the application processor, a wakeup instruction used to wake up voice interaction software.

Specifically, the microprocessor obtains a user image feature based on the user image data, and determines, based on the user image feature, that the target user is in the voice interaction state.

The user image feature is an image feature used to uniquely identify a user. For example, the user image feature may include one or more of an eye feature, a face feature, and a lip feature. The voice interaction software may be software used to provide a voice interaction function. For example, the voice interaction software may be software such as a voice assistant.

Specifically, when the microprocessor receives the user image data, the microprocessor may extract the user image feature from the user image data, In addition, the microprocessor may pre-obtain and store an image feature of the target user. After extracting the user image feature, the microprocessor may determine, by using a face recognition method, that the user image feature matches the image feature of the target user. For example, the microprocessor matches the stored image feature of the target user with the user image feature. If the stored image feature of the target user matches the user image feature, the microprocessor determines that the user corresponding to the user image feature is the target user. If the stored image feature of the target user does not match the user image feature, the microprocessor determines that the user corresponding to the user image feature is not the target user. When the microprocessor determines that the user corresponding to the user image feature is the target user, the microprocessor may further determine, by using a live detection method, that the target user is in the voice interaction state. For example, the microprocessor may determine, based on a lip feature in the user image feature in a period of time, whether the target user is speaking. When determining that the target user is speaking, the microprocessor may determine that the target user is in the voice interaction state. Then, the microprocessor may send, to the application processor, the wakeup instruction used to wake up the voice interaction software.

S205. The application processor receives the wakeup instruction, and wakes up the voice interaction software to provide the voice interaction function for the target user.

The voice interaction software may run on the application processor, and when the voice interaction software has not been used for a long time, the voice interaction software may be in a standby state or a low power consumption state, in other words, power consumption of the voice interaction software is lower than power consumption in a normal working status. When the application processor receives the wakeup instruction sent by the microprocessor, the application processor may wake up the voice interaction software, so that the voice interaction software provides the voice interaction function for the target user.

In this embodiment of this application, a user does not need to wake up the voice interaction software by using a wakeup keyword, but instead, the microprocessor with relatively low power consumption receives and processes the voice data transmitted by the voice collector and the user image data transmitted by the image collector, and when determining that the target user is in the voice interaction state, the microprocessor sends, to the application processor, the wakeup instruction used to wake up the voice interaction software, to provide the voice interaction function for the target user. Therefore, a friendly and natural voice interaction effect is achieved, and the voice interaction software does not need to be in an operating state for a long time, thereby reducing power consumption of the electronic device.

Figure 3:
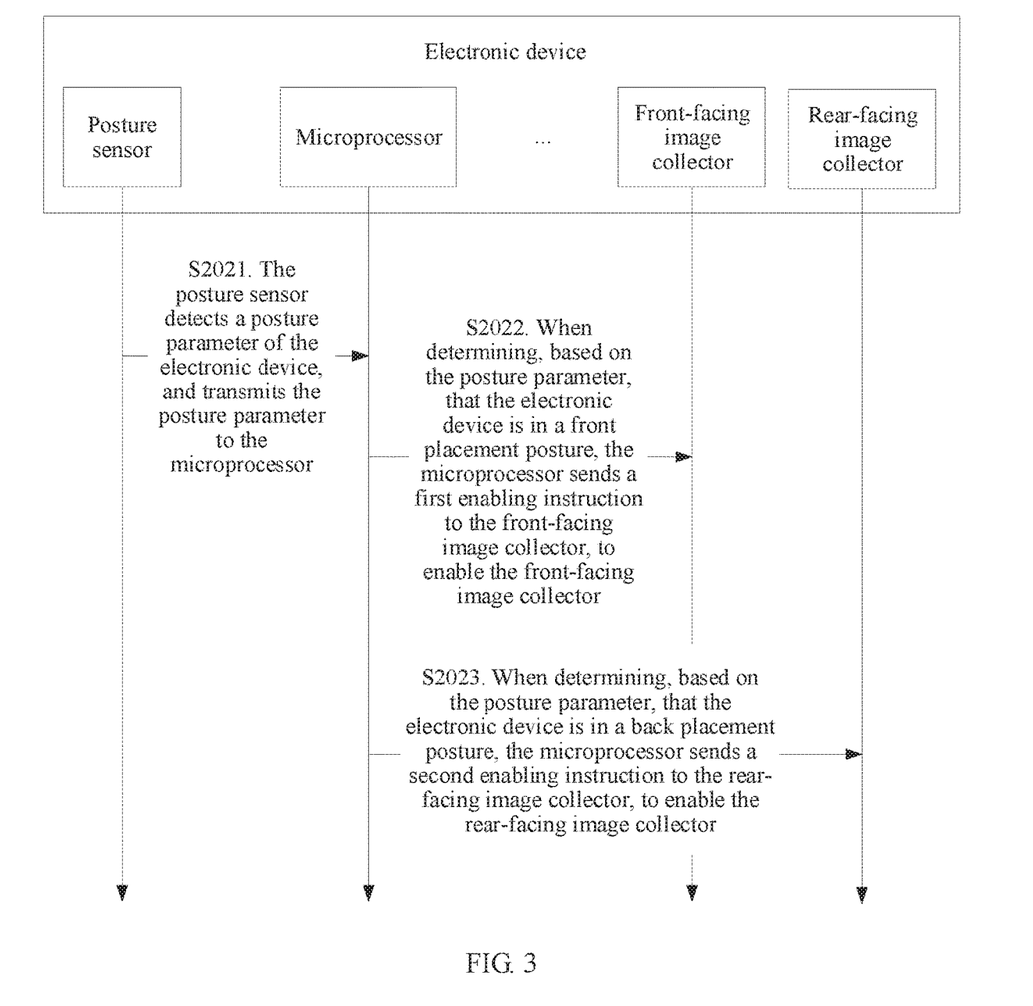
FIG. 3 is a schematic flowchart of another voice interaction processing method according to an embodiment of this application.

Further, the electronic device includes a posture sensor, and the image collector includes a front-facing image collector and a rear-facing image collector. Correspondingly, in S202, when the microprocessor enables the image collector, the front-facing collector or the rear-facing image collector may be specifically enabled by using the following method shown in FIG. 3. As shown in FIG. 3, the method includes S2021 to S2023. Power consumption of the electronic device can be further reduced by enabling the front-facing collector or the rear-facing image collector by using a method shown in S2021 to S2023.

S2021. A posture sensor detects a posture parameter of the electronic device, and transmits the posture parameter to the microprocessor.

Figure 4:
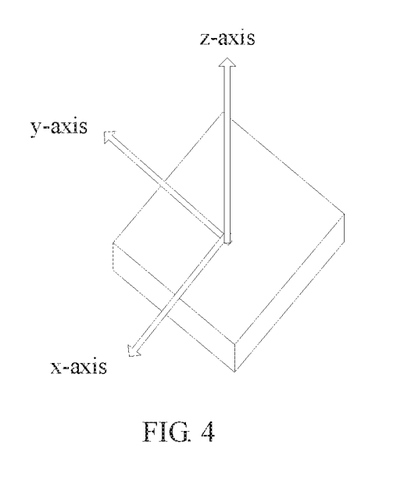
FIG. 4 is a schematic diagram of a type of three-dimensional space according to an embodiment of this application.

The posture sensor may be a sensor that can be used to detect a posture of the electronic device. For example, the posture sensor may include an acceleration sensor or a gyroscope sensor. The posture parameter may include a parameter of the electronic device in preset three-dimensional space, and the three-dimensional space may include an x-axis, a y-axis, and a z-axis. For example, the three-dimensional space is shown in FIG. 4, the x-axis and the y-axis are perpendicular to each other and form a horizontal plane, and the z-axis is perpendicular to the horizontal plane. For example, it is assumed that when the electronic device is horizontally placed on the horizontal plane and faces upward, the x-axis, the y-axis, and the z-axis correspond to (0, 0, 9.81); and it is assumed that when the electronic device is horizontally placed on the horizontal plane and faces downward, the x-axis, the y-axis, and the z-axis correspond to (0, 0, −9.81).

Specifically, the posture sensor may be set to an operating state, and the posture sensor may detect the posture parameter of the electronic device in real time, periodically, or aperiodically, and transmit the detected posture parameter to the microprocessor. For example, the posture sensor may periodically detect the parameter of the electronic device in the three-dimensional space shown in FIG. 4, and transmit detected values corresponding to the x-axis, the y-axis, and the z-axis to the microprocessor.

It should be noted that the posture parameter is described above only by using the three-dimensional space shown in FIG. 4 as an example. In actual application, the posture parameter may be represented in another manner. This is not specifically limited in this embodiment of this application.

S2022. When determining, based on the posture parameter, that the electronic device is in a front placement posture, the microprocessor sends a first enabling instruction to the front-facing image collector, to enable the front-facing image collector.

When the microprocessor receives the posture parameter, the microprocessor may determine a placement status of the electronic device based on the posture parameter. It is assumed that a posture parameter corresponding to the front placement posture includes: A value of the parameter that is corresponding to the z-axis in the three-dimensional space is greater than 0 and is less than or equal to 9.81. If a value corresponding to the z-axis in the posture parameter received by the microprocessor falls within a range of (0, 9,81], it is determined that the electronic device is in the front placement posture, so that the microprocessor sends the first enabling instruction to the front-facing image collector, and the image collector is enabled and collects the user image data when receiving the first enabling instruction.

S2023. When determining, based on the posture parameter, that the electronic device is in a back placement posture, the microprocessor sends a second enabling instruction to the rear-facing image collector, to enable the rear-facing image collector.

It is assumed that a posture parameter corresponding to the back placement posture includes: A value of the parameter that is corresponding to the z-axis in the three-dimensional space is greater than or equal to −9.81 and is less than to 0. If the value corresponding to the z-axis in the posture parameter received by the microprocessor falls within a range of [0, 9.81], it is determined that the electronic device is in the back placement posture. For example, if the microprocessor determines that the value corresponding to the z-axis in the posture parameter is greater than or equal to −9.81 and less than 0, the microprocessor may determine that the electronic device is in the back placement posture. Therefore, the microprocessor sends the second enabling instruction to the rear-facing image collector, so that the rear-facing image collector is enabled and collects the user image data when receiving the second enabling instruction.

It should be noted that, descriptions are provided above only by using the front placement posture, the back placement posture, and the corresponding value ranges as an example. In actual application, another posture and different value ranges may be set for implementation. Details are not described in this embodiment of this application.

Further, the electronic device includes a distance sensor. Correspondingly, before the voice collector collects the voice data of the first user by using S201, the method further includes the following steps to enable the voice collector. Details are as follows.

S2011. The distance sensor detects a distance between the first user and the electronic device, and transmits the distance to the microprocessor.

The distance sensor may be configured to detect a distance between an external object and the electronic device. For example, the distance sensor may be an optical proximity sensor. Specifically, the distance sensor may be set to an operating state, and the distance sensor may detect the distance between the external object (for example, the external object is the first user) and the electronic device in real time, periodically, or aperiodically, and transmit the detected distance to the microprocessor.

S2012. When determining that the distance is less than or equal to a preset distance, the microprocessor sends a third enabling instruction to the voice collector, to enable the voice collector.

The preset distance may be preset, and a specific value of the preset distance may be set by a person skilled in the art based on an actual requirement. This is not specifically limited in this embodiment of this application. Specifically, when the microprocessor receives the distance, the microprocessor may determine whether the distance is less than or equal to the preset distance, for example, the preset distance is 20 centimeters (cm). When determining that the distance is less than the preset distance, the microprocessor may send the third enabling instruction to the voice collector, so that the voice collector is enabled and collects the voice data of the first user when receiving the third enabling instruction.

In this embodiment of this application, the distance between the first user and the electronic device is detected, and when the distance is less than or equal to the preset distance, the voice collector is enabled to collect the voice data of the first user. Because power consumption of the distance sensor is usually less than power consumption of the voice collector, power consumption of the electronic device can be further reduced compared with that in a case in which the voice collector is being in the operating state for a long time.

An embodiment of this application further provides a voice interaction processing apparatus. For a structure of the apparatus, refer to FIG. 1. The apparatus may be an electronic device or a chip system built in an electronic device. In this embodiment of this application, a voice collector is configured to collect voice data of a first user and transmit the voice data to a microprocessor. The microprocessor is configured to: obtain a user voiceprint feature based on the voice data of the first user, and enable an image collector when determining, based on the user voiceprint feature, that the first user is a target user. The image collector is configured to collect user image data and transmit the user image data to the microprocessor. The microprocessor is further configured to: obtain a user image feature based on the user image data, and when determining, based on the user image feature, that the target user is in a voice interaction state, send, to an application processor, a wakeup instruction used to wake up voice interaction software. The application processor is configured to receive the wakeup instruction and wake up the voice interaction software to provide a voice interaction function for the target user.

Optionally, when determining, based on the user image feature, that the target user is in the voice interaction state, the microprocessor is specifically configured to determine, based on the user image data and by using a live detection method, that the target user is in the voice interaction state.

In another embodiment of this application, a posture sensor is configured to detect a posture parameter of the apparatus and transmit the posture parameter to the microprocessor. The image collector includes a front-facing image collector and a rear-facing image collector. The microprocessor is further configured to: when determining, based on the posture parameter, that the apparatus is in a front placement posture, send a first enabling instruction to the front-facing image collector to enable the front-facing image collector; or the microprocessor is further configured to: when determining, based on the posture parameter, that the apparatus is in a back placement posture, send a second enabling instruction to the rear-facing image collector to enable the rear-facing image collector.

In another embodiment of this application, a distance sensor is configured to detect a distance between the first user and the apparatus and transmit the distance to the microprocessor. The microprocessor is further configured to: when determining that the distance is less than or equal to a preset distance, send a third enabling instruction to the voice collector to enable the voice collector.

It should be noted that for related descriptions of the voice collector, the image collector, the microprocessor, the application processor, the posture sensor, and the distance sensor, refer to the related descriptions in the foregoing method embodiment. Details are not described again in this embodiment of this application.

In this embodiment of this application, a user does not need to wake up the voice interaction software by using a wakeup keyword, but instead, the microprocessor with relatively low power consumption receives and processes the voice data transmitted by the voice collector and the user image data transmitted by the image collector, and when determining that the target user is in the voice interaction state, the microprocessor sends, to the application processor, the wakeup instruction used to wake up the voice interaction software, to provide the voice interaction function for the target user. Therefore, a friendly and natural voice interaction effect is achieved, and the voice interaction software does not need to be in an operating state for a long time, thereby reducing power consumption of the apparatus.

Finally, it should be noted that the foregoing descriptions are merely specific implementations of this application, but the protection scope of this application is not limited to the forgoing descriptions. Any variation or replacement within the technical scope disclosed in this application shall fall within the protection scope of this application. Therefore, the protection scope of this application shall be subject to the protection scope of the claims.

The invention claimed is:

1. A voice interaction processing apparatus, wherein the apparatus comprises a microprocessor, an application processor, and a posture sensor; wherein
the posture sensor is configured to:
  detect a posture parameter of the apparatus; and
  transmit the posture parameter to the microprocessor;
the microprocessor is configured to:
  receive voice data of a first user;
  determine, based on the voice data of the first user, that the first user is a target user;
  in response to determining that the first user is the target user, receive user image data,
  wherein receiving the user image data comprises:
    in response to determining, based on the posture parameter, that the apparatus is in a front placement posture, sending a first enabling instruction that instructs to collect a front-facing image; or
    in response to determining, based on the posture parameter, that the apparatus is in a back placement posture, sending a second enabling instruction that instructs to collect a back-facing image;
  determine, based on at least one feature of the target user comprised in the user image data, that the target user is speaking; and
  send a wakeup instruction to the application processor in response to determining that the target user is speaking based on the at least one feature of the target user comprised in the user image data; and
the application processor is configured to receive the wakeup instruction and wake up voice interaction software to provide a voice interaction function for the target user.

2. The apparatus according to claim 1, wherein the microprocessor is configured to:
  determine, based on the user image data and by using a living detection method, that the target user is speaking.

3. The apparatus according to claim 1, wherein the apparatus further comprises:
  a distance sensor, configured to detect a distance between the first user and the apparatus and transmit the distance to the microprocessor; and
  wherein the microprocessor is further configured to: in response to determining that the distance is less than or equal to a preset distance, send a third enabling instruction.

4. The apparatus according to claim 1, wherein the first enabling instruction is sent to a front-facing camera, or the second enabling instruction is sent to a back-facing camera.

5. The apparatus according to claim 1, wherein the at least one feature comprises a lip feature indicating that the target user is speaking.

6. A voice interaction processing method, wherein the method is applied to an apparatus comprising a microprocessor, an application processor, and a posture sensor, and wherein the method comprises:
  detecting, by the posture sensor, a posture parameter of the apparatus;
  transmitting, by the posture sensor, the posture parameter to the microprocessor;
  receiving, by the microprocessor, voice data of a first user;
  determining, by the microprocessor and based on the voice data of the first user, that the first user is a target user;
  in response to determining that the first user is the target user, receiving, by the microprocessor, user image data, wherein receiving the user image data comprises:
    in response to determining, based on the posture parameter, that the apparatus is in a front placement posture, sending a first enabling instruction that instructs to collect a front-facing image; or
    in response to determining, based on the posture parameter, that the apparatus is in a back placement posture, sending a second enabling instruction that instructs to collect a back-facing image;
  determining, based on at least one feature of the target user comprised in the user image data, that the target user is speaking;
  sending, by the microprocessor, a wakeup instruction to the application processor in response to determining that the target user is speaking based on the at least one feature of the target user comprised in the user image data; and
  receiving, by the application processor, the wakeup instruction, and waking up voice interaction software to provide a voice interaction function for the target user.

7. The method according to claim 6, wherein the determining that the user image data indicates that the target user is speaking comprises:
  determining, based on the user image data and by using a living detection method, that the target user is speaking.

8. The method according to claim 6, wherein the apparatus further comprises a distance sensor, and the method further comprises:
  detecting, by the distance sensor, a distance between the first user and the apparatus, and transmitting the distance to the microprocessor; and
  in response to determining that the distance is less than or equal to a preset distance, sending, by the microprocessor, a third enabling instruction.

9. The method according to claim 6, wherein the first enabling instruction is sent to a front-facing camera, or the second enabling instruction is sent to a back-facing camera.

10. The method according to claim 6, wherein the at least one feature comprises a lip feature indicating that the target user is speaking.

11. A non-transitory computer-readable storage medium storing programming instructions for execution by a microprocessor, an application processor, and a posture sensor comprised in an apparatus, that when executed by the microprocessor and the application processor, cause the apparatus to perform operations comprising:
  detecting, by the posture sensor, a posture parameter of the apparatus;
  transmitting, by the posture sensor, the posture parameter to the microprocessor;
  receiving, by the microprocessor, voice data of a first user;
  determining, by the microprocessor and based on the voice data of the first user, that the first user is a target user;
  in response to determining that the first user is the target user, receiving, by the microprocessor, user image data, wherein receiving the user image data comprises:
    in response to determining, based on the posture parameter, that the apparatus is in a front placement posture, sending a first enabling instruction that instructs to collect a front-facing image; or
    in response to determining, based on the posture parameter, that the apparatus is in a back placement posture, sending a second enabling instruction that instructs to collect a back-facing image;

determining, based on at least one feature of the target user comprised in the user image data, that the target user is speaking;

sending, by the microprocessor, a wakeup instruction to the application processor in response to determining that the target user is speaking based on the at least one feature of the target user comprised in the user image data; and receiving, by the application processor, the wakeup instruction, and waking up voice interaction software to provide a voice interaction function for the target user.

12. The non-transitory computer-readable storage medium according to claim 11, wherein the determining that the user image data indicates that the target user is speaking comprises:

determining, based on the user image data and by using a living detection method, that the target user is speaking.

13. The non-transitory computer-readable storage medium according to claim 11, wherein the apparatus further comprises a distance sensor, and the operations further comprise:

detecting, by the distance sensor, a distance between the first user and the apparatus, and transmitting the distance to the microprocessor; and in response to determining that the distance is less than or equal to a preset distance, sending, by the microprocessor, a third enabling instruction.

14. The non-transitory computer-readable storage medium according to claim 11, wherein the first enabling instruction is sent to a front-facing camera, or the second enabling instruction is sent to a back-facing camera.

15. The non-transitory computer-readable storage medium according to claim 11, wherein the at least one feature comprises a lip feature indicating that the target user is speaking.

* * * * *

UNITED STATES PATENT AND TRADEMARK OFFICE
CERTIFICATE OF CORRECTION

| | |
|---|---|
| PATENT NO. | : 11,620,995 B2 |
| APPLICATION NO. | : 16/840753 |
| DATED | : April 4, 2023 |
| INVENTOR(S) | : Bailin Wen |

It is certified that error appears in the above-identified patent and that said Letters Patent is hereby corrected as shown below:

On the Title Page

Item (57) ABSTRACT, Line 12, delete "nus-enabling" and insert -- mis-enabling --.

Signed and Sealed this
Fourth Day of July, 2023

Katherine Kelly Vidal
*Director of the United States Patent and Trademark Office*